July 30, 1940.   A. H. CARR   2,209,509

PROCESS OF MAKING RUBBER THREAD

Filed June 10, 1938

Inventor
Arthur H. Carr.

Patented July 30, 1940

2,209,509

UNITED STATES PATENT OFFICE 2,209,509

PROCESS OF MAKING RUBBER THREAD

Arthur H. Carr, Bristol, R. I., assignor to Carr Manufacturing Corporation, Bristol, R. I., a corporation of Rhode Island Application June 10, 1938, Serial No. 212,981

2 Claims. (Cl. 18—54)

This invention relates to the manufacture of cut rubber thread. In such manufacture unvulcanized rubber is commonly run through a calender, from which it is delivered in the form of a long thin sheet of rubber, corresponding in thickness to the desired thickness of the thread to be manufactured. This long thin sheet of rubber is then vulcanized in some usual manner, after which the sheet is cut lengthwise into threads of the desired width. Commonly the width of the thread is made equal to the thickness.

It is the general object of my present invention to provide an improved process for cutting rubber threads from a sheet of rubber either before or after vulcanization. To the attainment of this object, my invention comprises a certain novel process in which sheet rubber is subjected to a low or sub-zero temperature, and in which the cutting of the sheet of rubber into threads is performed while said rubber remains in frozen condition.

My invention further relates to certain ordered procedure which will be hereinafter described and more particularly pointed out in the appended claims.

Certain steps in my improved process are indicated in the drawing, in which

In one manner of carrying out my invention, a long sheet of rubber of the desired thickness is prepared and vulcanized in the usual manner. I then form this long vulcanized sheet into a firm package P by some such operation as rolling, folding, doubling or stacking. My preferred practice is to wind the sheet into a tight roll or to wind it into a relatively flat bolt, similar to the bolts of cloth which are delivered to retail merchants.

After the rubber has been thus formed into a firm package, I subject the package to a low and commonly sub-zero temperature, such that the rubber is frozen and is converted from a yielding substance to a substantially rigid and unyielding material. After being thus frozen, the tightly wound rubber resembles vulcanized fibre or a phenol condensation product.

The frozen package P of sheet rubber is then cut into rubber threads while still in frozen condition, preferably by removing successive thin slices S of rubber from the end of the roll or bolt, either by a rotating disc or cutter C or by a slicing knife. During the slicing operation, the frozen rubber package is preferably heat-insulated to the cutting point as indicated at H, so that the rubber remains in frozen or rigid condition until after the cutting operation.

It will be evident that each slice S thus removed from the end of the package comprises a continuous thread which has the same length as the sheet of rubber which was formed into the package.

After the threads are thus produced in slice form, the rubber in each slice is allowed to thaw out and to return to normal condition, and the threads are then straightened out and may be subjected to covering or such other finishing operations as may be desired.

Figure 1:
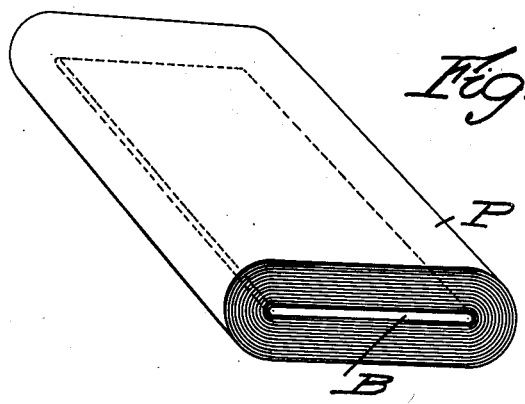
Fig. 1 is a perspective view of a sheet rubber package to be sliced.
Figure 2:
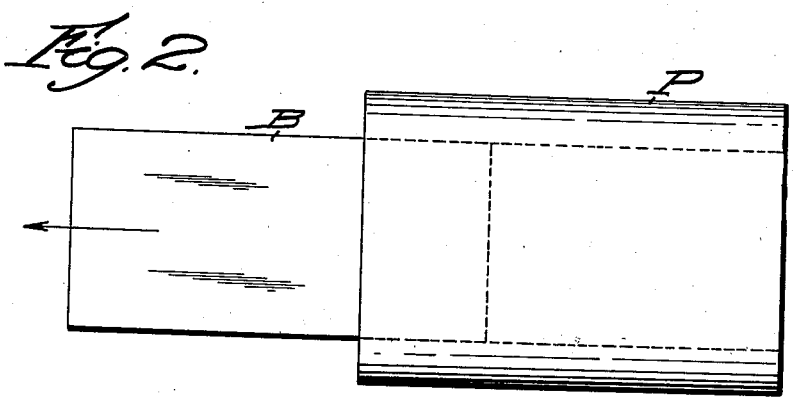
Fig. 2 is a plan view showing removal of the core or cloth board from the package.
Figure 3:
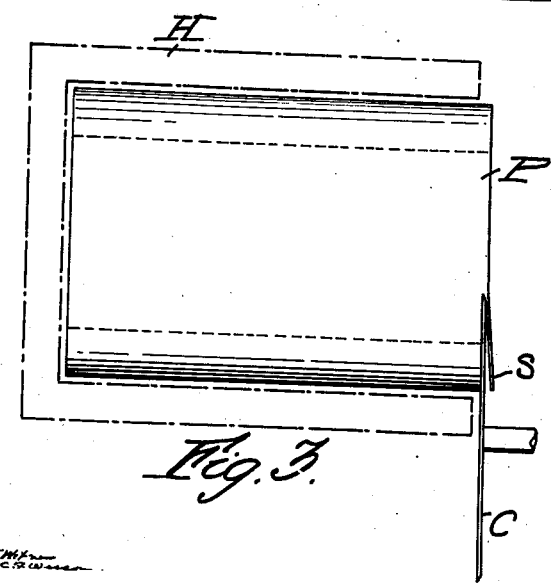
Fig. 3 is a plan view indicating the slicing operation.
Figure 4:
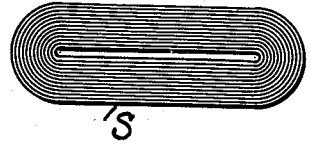
Fig. 4 is a front elevation of one of the severed frozen slices.

If a core or board B is used in winding the roll or bolt, this core or board should be removed as indicated in Fig. 2, either before or after the freezing operation and before the cutting operation.

In a second manner of carrying out my invention, a sheet of unvulcanized rubber is dusted with talc or otherwise treated to prevent excessive adhesion and is then wound into a firm package, frozen and sliced, all as previously described. The slices are then allowed to thaw out and the rubber threads thus formed are vulcanized, either while in sliced form or after unwinding and assembling.

This second manner of procedure has one important advantage in that all waste produced in the cutting operation consists of unvulcanized rubber which can be reworked without loss, whereas vulcanized rubber waste is of relatively little value.

By thus freezing the rubber before cutting, I avoid all difficulties arising from the inherent yielding nature of rubber suitable for threads and I am able to carry out the cutting operation on an unyielding rubber mass, so that the cutting operation can be much more accurately performed and so that uniform dimensions of the threads can be more satisfactorily maintained.

Having thus described my invention and the advantages thereof, I do not wish to be limited to the details herein disclosed, otherwise than as set forth in the claims, but what I claim is:

1. The process of making cut rubber thread which consists in forming a long thin continuous sheet of rubber into a firm close multiply package of relatively narrow cross section and with the long continuous edges of said sheet disposed at the ends of said package and in spaced parallel planes, subjecting said package to a sufficiently low temperature to freeze the rubber and convert said rubber package into a substantially rigid and unyielding block of material, and making successive cuts directly across one entire end of the package, thereby severing successive thin slices of rubber from said end of said package while said package is still frozen, each slice comprising a separate continuous cut rubber thread.

2. The process of making cut rubber thread which consists in forming a long thin sheet of rubber into a flat bolt on a winding board, removing the winding board from said bolt and freezing said bolt of rubber to a substantially unyielding condition, and then making successive cuts directly across the entire end of the package, thereby severing successive thin slices of rubber from the end of said package while said package is still frozen, each slice comprising a separate continuous cut rubber thread.

ARTHUR H. CARR.